May 23, 1933.  A. KÉGRESSE  1,910,798
ENDLESS TRACK VEHICLE
Filed Dec. 22, 1930  2 Sheets-Sheet 1

INVENTOR:
Adolphe Kégresse
BY
ATTORNEY

May 23, 1933.  A. KÉGRESSE  1,910,798
ENDLESS TRACK VEHICLE
Filed Dec. 22, 1930  2 Sheets-Sheet 2
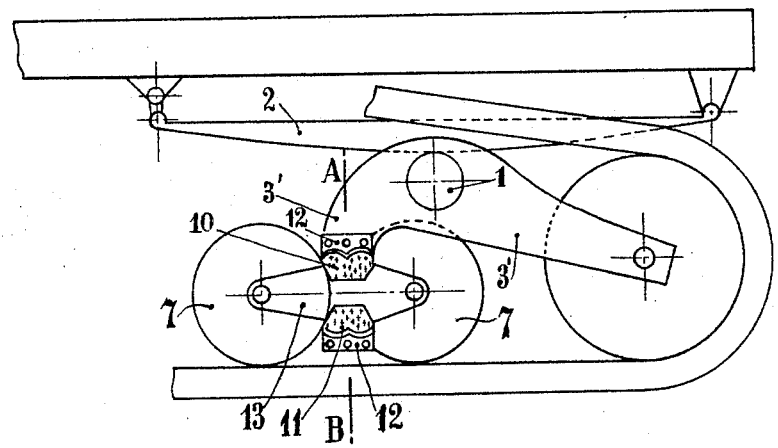
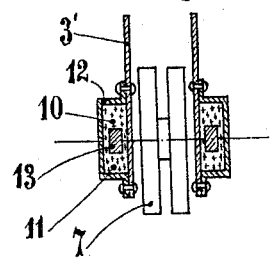
INVENTOR:
Adolphe Kégresse
BY
ATTORNEY Patented May 23, 1933

1,910,798

UNITED STATES PATENT OFFICE

ADOLPHE KÉGRESSE, OF COURBEVOIE, FRANCE

ENDLESS TRACK VEHICLE

Application filed December 22, 1930, Serial No. 504,162, and in France December 30, 1929.

It is greatly important, in the endless strip driving apparatus, to elastically connect the weight carrying rollers to the remaining mechanism in such a way that this elastic device should be able to absorb the vibrations produced by the ground on which the vehicle is moving, at a point as near their origin as possible.

The present invention has for its object to provide a device for elastically adjusting the roller bogies on the load carrying main equalizer, in the vehicles of the type mentioned.

In the appended drawings two embodiments of the present invention are represented, by way of example, but it should be noted that other constructions are possible, without going beyond the scope of the invention.

Figure 3 is an elevational view of a modification of the invention.

Figure 4 shows a section through A–B of Figure 3.

Figure 1:
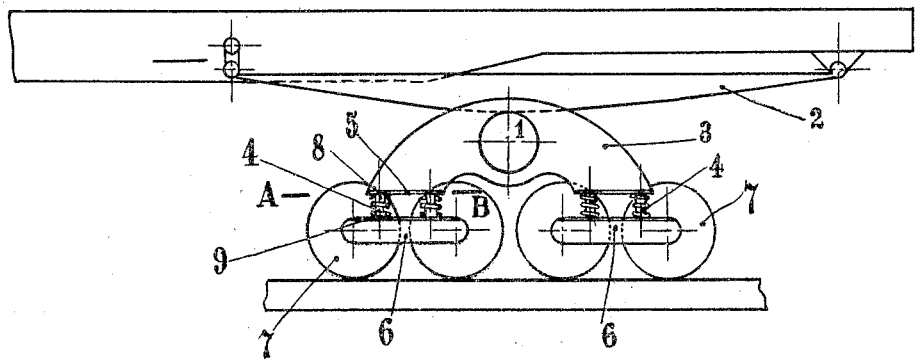
Figure 1 is an elevation view of an embodiment corresponding to a two bogie arrangement.
Figure 2:
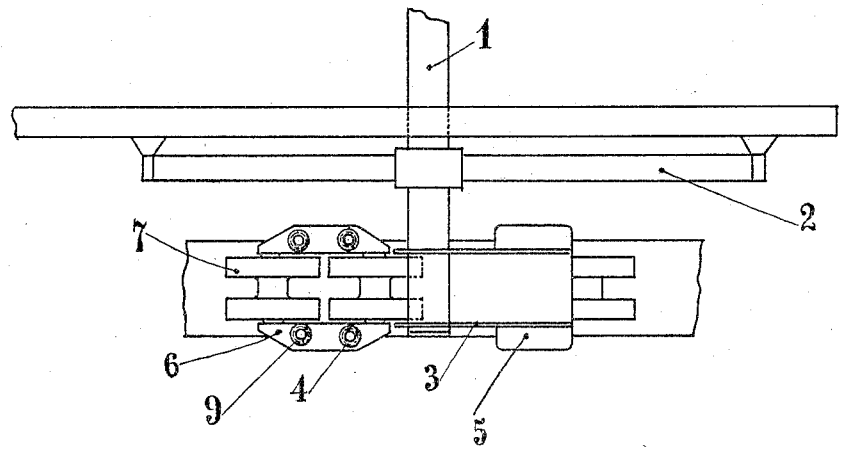
Figure 2 is a plan view of above figure, showing a part section through A–B, one end of the equalizer being broken away.

Throughout the figures, 1 denotes the carrying axle of the vehicle part corresponding to the driving system; this axle is secured to the frame by means of a known device, for instance, by means of plate springs 2 (Figures 1, 2, 3). A load carrying, main equalizer indicated by reference numeral 3 in Figs. 1 and 2 and reference numeral 3' in Figs. 3 and 4 is fitted to oscillate on each axle end 1, (Figures 1, 2, 3).

In the device represented in Figures 1 and 2, the load carrying equalizer 3 is connected to each roller set by means of spiral-springs 4, which are confined between a plate 5 provided at the lower side of an end of the equalizer and plates 6 connecting the rollers 7 of each bogie.

The spiral-springs are guided, at their respective ends, by buffers 8 and 9, the first of which is integral with the lower part 5 of the equalizer 3 and the second with the connecting end-plate 6.

These guide buffers 8 and 9 serve at the same time as abutments, limiting the travel of the springs 4.

In the modification represented on Figures 3 and 4, instead of spiral-springs, blocks 10 and 11, of convenient shape, are used, made out of flexible material, rubber for instance, externally adjusted, inside the member 12 secured at the lower part of the equalizer 3.

The inner parts of these blocks 10 and 11 are adjusted on the pieces 13 connecting the rollers 7.

These connecting ties 13 possess a convenient form, so as to prevent any important longitudinal displacement of the roller set responsive to the equalizer 3.

These blocks 10 and 11 are pressed on being mounted so as to hold firmly the bogie comprising the connecting pieces 13 and rollers 7.

As shown in the two embodiments described, an elastic connection between the rollers and the load carrying main equalizer is thus realized.

In the embodiment represented in the Figures 1 and 2, the spiral-springs 4 will absorb the vibrations, whatever their direction may be.

In the modification shown in Figures 3 and 4, the vibrations will be quenched by the elastic blocks 10 and 11.

In both cases, no articulation is used; the elasticity of the springs 4, on the one hand, and the flexibility of the blocks 10 and 11 on the other hand, will allow the rollers 7 of the same bogie to perform oscillations in respect to each other.

Having now particularly described and ascertained the nature of my said invention as well as the manner in which the same is to be performed, I declare that what I claim is:

1. A vehicle having an endless track, comprising an axle, a rigid equalizer pivotally mounted on the axle, a bogie comprising a plurality of longitudinally spaced wheels bearing on the interior of the endless track, a carriage connecting the axes of the wheels, resilient means positioned between one end of the equalizer and the carriage and contacting with said end of the equalizer and with the carriage on opposite sides of a point between the longitudinally spaced wheels to resiliently oppose rocking movement of the carriage about said point, and means on the other end of the equalizer bearing on the interior of the endless track.

2. The vehicle set forth in claim 1, wherein the means for resiliently connecting the equalizer and the bogie comprises spiral springs.

3. The vehicle set forth in claim 1, wherein the means for resiliently connecting the equalizer and the bogie comprises resilient blocks.

4. A vehicle having an endless track comprising an axle, a rigid equalizer pivotally mounted on the axle, a bogie comprising a plurality of longitudinally spaced wheels bearing on the interior of the endless track, a carriage connecting the axes of the wheels, resilient means positioned between one end of the equalizer and the carriage and contacting with said end of the equalizer and with the carriage on opposite sides of a point between the longitudinally spaced wheels to resiliently oppose rocking movement of the carriage about said point, and a bogie similarly attached to the other end of the equalizer and bearing on the interior of the endless track.

In testimony whereof I affix my signature.

ADOLPHE KÉGRESSE.